United States Patent
Kysar et al.

(10) Patent No.: US 12,260,773 B1
(45) Date of Patent: Mar. 25, 2025

(54) FLIGHT TRAINING AND LANDING ASSISTANT

(71) Applicants: Erik Kysar, Yacolt, WA (US); Sami Kysar, Laporte, CO (US)

(72) Inventors: Erik Kysar, Yacolt, WA (US); Sami Kysar, Laporte, CO (US)

( * ) Notice: Subject to any disclaimer, the term of this patent is extended or adjusted under 35 U.S.C. 154(b) by 925 days.

(21) Appl. No.: 17/322,694

(22) Filed: May 17, 2021

Related U.S. Application Data

(60) Provisional application No. 63/027,207, filed on May 19, 2020.

(51) Int. Cl.
- *G09B 19/16* (2006.01)
- *B64D 45/08* (2006.01)
- *G01C 23/00* (2006.01)

(52) U.S. Cl.
CPC ........... *G09B 19/167* (2013.01); *B64D 45/08* (2013.01); *G01C 23/005* (2013.01)

(58) Field of Classification Search
USPC ..... 244/54, 118.5, 118.1, 118.6, 234, 135 A, 244/137.1, 110 F, 122 R, 131, 137.4, 3, 244/110 B, 129.5, 136, 137.2, 139, 2, 244/905, 101, 102 R, 107, 113, 117 R, 244/118.2, 119, 121, 122 B, 129.4, 135 R, 244/140, 159.3, 169, 1 R, 213, 214, 215, 244/221, 236, 52, 53 R, 55, 58, 63, 99.12, 244/100 R, 180, 191, 195, 75.1, 17.13, 244/17.23, 183, 185, 187, 188, 76 R, 3.1, 244/158.1, 4 R, 24, 34 R, 50, 51, 62, 244/110 R, 114 R, 138 R, 153 R, 900, 244/FOR. 000, FOR. 100, FOR. 104; 29/281.1, 281.4, 281.6, 428, 401.1, 426.2, 29/559, 897.2; 340/961, 958, 435, 340/815.45, 932.2, 945, 946, 981, 983, 340/960, 971, 995.19, 436, 947, 970, 972, 340/948, 951, 959, 963, 964, 967, 973, 340/975, 992; 114/68, 123; 180/6.48, 180/6.58, 65.31; 250/330, 578.1, 234, 250/372, 202; 342/52, 27, 54, 56, 62, 342/470, 341, 120, 149, 38, 140, 29, 33, 342/355, 357.31, 358, 458, 63, 65;
(Continued)

(56) References Cited

U.S. PATENT DOCUMENTS

| | | | | |
|---|---|---|---|---|
| 3,868,074 A | * | 2/1975 | Hill | G01R 29/12 340/975 |
| 9,703,295 B1 | * | 7/2017 | Neal, III | B64C 31/02 |

(Continued)

*Primary Examiner* — Daniel Previl

(74) *Attorney, Agent, or Firm* — Rylander & Associates, PC; Philip R. M. Hunt

(57) ABSTRACT

A flight training and landing assistant which utilizes a processor, a time-of-flight laser distance measurement device used to calculate vertical height measurements of the aircraft above the ground during landing and takeoff modes of flight, automatically compensating for user installation errors electronically. In some embodiments, the flight training and landing assistant determines and communicates various information such as pitch, roll, and g-forces. In some embodiments, the flight training and landing assistant may be installed either temporarily or permanently. In some embodiments, the flight training and landing assistant is configured to communicate to the pilot (user) or autopilot via aural, visual, or electronic means.

18 Claims, 4 Drawing Sheets

(58) Field of Classification Search
USPC .......... 410/118, 129, 97; 439/265, 345, 365,
439/370; 60/226.2, 232, 253, 797, 798;
89/36.02, 36.11, 901, 903, 918; 100/211;
118/723 R, 726; 156/580, 94; 16/18 R;
182/150; 187/222, 224, 237, 244, 401,
187/404; 188/379; 206/319, 0.5, 0.6,
206/0.8, 85, 96, 730, 736, 139, 77.1, 204,
206/205, 214, 215, 551, 219, 216, 242;
211/183, 88.01; 212/197; 220/654;
224/401, 538, 540; 239/171, 265.29,
239/687; 242/379.2; 248/421, 548, 555;
254/124; 463/31, 2, 6; 434/29, 30, 43,
434/33, 49; 701/23, 1, 400, 300,
701/FOR. 000, FOR. 107, 3, 4, 408, 19,
701/301, 495, 16, 29.3, 416, 13, 17, 18,
701/20, 29.7, 31.4, 31.7, 446, 460, 469,
701/5, 500, 501, 505, 514, 532; 367/1, 2,
367/7, 12, 13, 14, 81, 86, 87, 117, 197,
367/118, 131, 135, 137, 140, 191, 900,
367/901, 902, 903, 904, 905, 906, 907,
367/908, 909, 910, 911, FOR. 000;
324/300, 323, 376, 378, 403, 415, 425,
324/451, 452, 457, 459, 200, 500, 557,
324/600, 66, 160, 71.1, 73.1, 72, 74,
324/76.11, 800, FOR. 000, FOR. 123;
119/449, 436, 437, 300, 346, 448, 531,
119/200, 270, 6.5, 6.7, 6.8, 14.1, 301,
119/302, 311, 329, 400, 416, 50.7, 28.5,
119/51.01, 69.5, 72, 600, 650, 700, 701,
119/702, 712, 850, 856, 866, 867, 161,
119/171, 174, 900, 901, 902, 903, 904,
119/905, 906, 907, 908, FOR. 000,
119/DIG. 1; 246/121, 3; 267/64.26;
356/4.01, 141.1, 3.1, 4.06; 702/113, 33,
702/34, 108, 127, 182, 189, 94, 1, 85,
702/FOR. 000, FOR. 134; 2/6.1;
318/490; 348/116, 117, 144, 222.1,
348/E5.096; 351/205, 209, 246; 353/7,
353/8; 359/465; 361/160; 370/329, 341;
382/100, 103, 107, 170, 209; 455/436,
455/437, 450, 524, 525; 473/199;
52/741.1; 700/175, 91; 703/8;
705/14.23, 26.1, 28, 30, 305, 31, 32, 34,
705/35, 37, 39, 400; 707/999.107,
707/E17.045
See application file for complete search history.

(56) References Cited

U.S. PATENT DOCUMENTS

| | | | |
|---|---|---|---|
| 2005/0007257 A1* | 1/2005 | Rast | G02B 27/017 340/815.45 |
| 2013/0085629 A1* | 4/2013 | Washington | B64C 13/18 701/15 |
| 2014/0100008 A1* | 4/2014 | Sitnikau | A63F 9/24 463/6 |
| 2015/0105172 A1* | 4/2015 | Thurman | A63B 71/0669 473/199 |
| 2018/0044019 A1* | 2/2018 | Morrison | G01V 3/165 |
| 2018/0118327 A1* | 5/2018 | Blevins | B64C 3/187 |
| 2019/0135416 A1* | 5/2019 | Woolcock | B64C 25/04 |
| 2019/0143934 A1* | 5/2019 | Tackett | B60R 22/4619 242/379.2 |
| 2020/0264028 A1* | 8/2020 | Hoang | G01F 23/80 |

* cited by examiner

FLIGHT TRAINING AND LANDING ASSISTANT

CROSS-REFERENCE TO RELATED APPLICATIONS

This application claims the benefit U.S. Provisional Application No. 63/027,207, filed 2020 May 19.

TECHNICAL FIELD

This specification relates to aviation electronics. More particularly, the present specification relates to relates to aviation electronics for training and landing.

BACKGROUND

One of the most critical and difficult tasks student pilots and transitioning pilots learn is landing. Landing is presently learned by simply flying the aircraft and landing it many times. The landing itself is a very short portion of the overall flying time and is completed visually, using the pilot's eyes to develop the proper sight picture for altitude and attitude, assisted by coaching from an experience flight instructor. This is an expensive process, requiring many iterations.

In addition, pilots transitioning to a new aircraft often struggle to determine exactly when the tires or skids will touch the runway, especially when transitioning to a larger aircraft or unfamiliar aircraft.

Current laser and radar altimeters are expensive and generally permanently mounted. These laser altimeters require mechanical gimbals, are subject to acceleration and deceleration errors, and have moving parts subject to associated errors. Because of the cost these are typically not used for flight training, causing students and transitioning pilots many frustrating hours and expense learning to land and maneuver an aircraft.

SUMMARY

A flight training and landing assistant which utilizes a processor, a time-of-flight laser distance measurement device used to calculate vertical height measurements of the aircraft above the ground during landing and takeoff modes of flight, automatically compensating for user installation errors electronically. In some embodiments, the flight training and landing assistant calculates and communicates various information such as pitch, roll, and g-forces. In some embodiments, the flight training and landing assistant may be installed either temporarily or permanently. In some embodiments, the flight training and landing assistant is configured to communicate to the pilot (user) or autopilot via aural, visual, or electronic means.

The flight training and landing assistant is designed to provide a cost-effective tool for training and transitioning pilots to immensely speed up the learning process, and provide the "feel" to transitioning pilots quickly. The flight training and landing assistant device is a low cost, reasonable accurate, self-correcting and self-adjusting device using off-the shelf mounts not needing FAA or EASA approval so a non-mechanic can mount them. It provides altitude readings, bank angles, g-forces and aural cues during landing and flight maneuvers to speed up the learning process. Integrated into the device is an accelerometer and other sensing apparatus to automatically compensate for installation error. The flight training and landing assistant device can be used on airplanes of any size.

BRIEF DESCRIPTION OF THE DRAWINGS

The accompanying drawings, which are incorporated into and constitute a part of this specification, illustrate one or more embodiments of the inventive subject matter and, together with the detailed description, serve to explain the principles and implementations thereof. Like reference numbers and characters are used to designate identical, corresponding, or similar components in different figures.

DETAILED DESCRIPTION

In describing the one or more representative embodiments of the inventive subject matter, use of directional terms such as "upper," "lower," "above," "below", "in front of," "behind," etc., unless otherwise stated, are intended to describe the positions and/or orientations of various components relative to one another as shown in the various Figures and are not intended to impose limitations on any position and/or orientation of any component relative to any reference point external to the Figures.

In the interest of clarity, not all of the routine features of representative embodiments of the inventive subject matter described herein are shown and described. It will, of course, be appreciated that in the development of any such actual implementation, numerous implementation-specific decisions must be made in order to achieve specific goals, such as compliance with application and business related constraints, and that these specific goals will vary from one implementation to another and from one developer to another. Those skilled in the art will recognize that numerous modifications and changes may be made to the representative embodiment(s) without departing from the scope of the claims. It will, of course, be understood that modifications of the representative embodiments will be apparent to those skilled in the art, some being apparent only after study, others being matters of routine mechanical, chemical and electronic design. No single feature, function or property of the representative embodiments is essential. In addition to the embodiments described, other embodiments of the inventive subject matter are possible, their specific designs depending upon the particular application. Any embodiment described as "comprising" includes the case of "consisting only of." The scope of the inventive subject matter should not be limited by the particular embodiments herein described but should be defined only by the appended claims and equivalents thereof.

The user of the systems and devices described herein are described as a "pilot" because a pilot would be the most typical user. However, is not meant to limit the use of the system to actual pilots. These systems and devices may be used by persons not currently flying an aircraft, such as a passenger. The systems and devices described herein were designed for use with fixed wing aircraft, but could be used with some modification by helicopter, drone, or any other flying machine.

First Representative Embodiment—Structure

Figure 1:
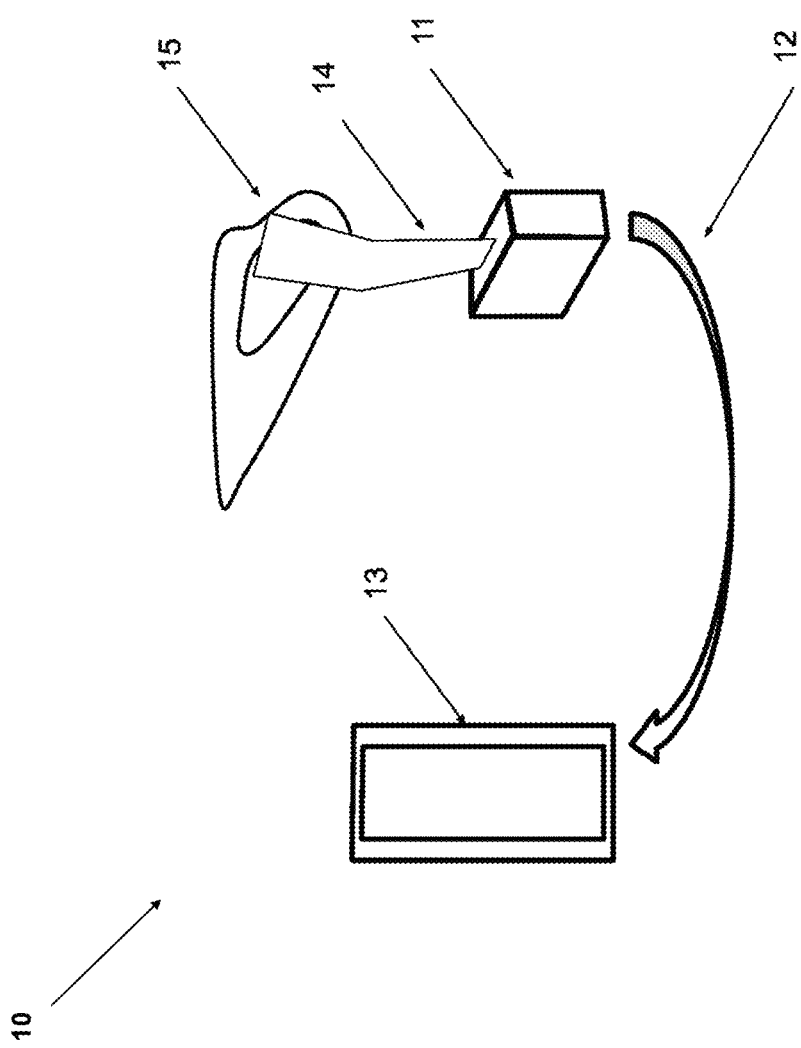
FIG. 1 shows a representative embodiment of a flight training assistant system 10.

FIG. 1 shows a representative embodiment of a flight training assistant system 10. The flight training assistant system 10 comprising a flight training assistant unit 11 attached to an aircraft at an aircraft attachment point 15 utilizing a temporary aircraft mount 14 such as those used to temporarily attach cameras to aircraft. The aircraft mount 14 is detachable and adjustable, in that it allows changes in the orientation of the flight training assistant unit 11. The aircraft attachment point 15 is mounted on the exterior of the aircraft in a suitable location. The aircraft attachment point 15 may be a tie down ring as shown, or may be some other suitable aircraft structure. In some alternative embodiments, the flight training assistant unit 11 is permanently mounted to the aircraft. The flight training assistant system 10 has a notification unit 13 that is configured to communicate with the flight training assistant unit 11 via a communication link 12. In the representative embodiment, the communication link 12 is a wireless pathway, but in other embodiments, the communication link 12 is hardwired. In the representative embodiment of the flight training assistant system 10, the notification unit 13 is a smart device, such as a smartphone or a tablet, with a software application. However, in alternative embodiments, the notification unit 13 is an autopilot control system integrated into the aircraft or some other suitable device.

Figure 2:
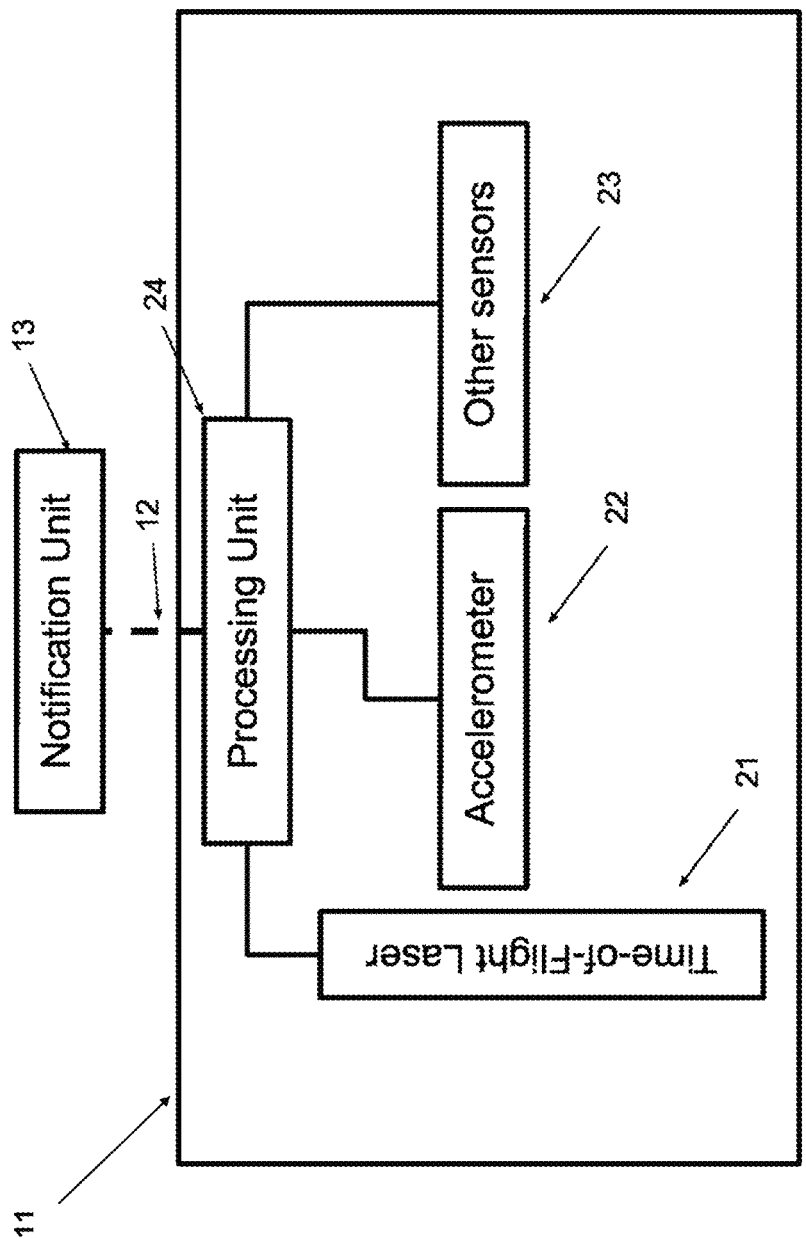
FIG. 2 shows a block schematic of the flight training assistant unit 11.

FIG. 2 shows a block schematic of the flight training assistant unit 11. The flight training assistant unit 11 includes a time-of-flight laser distance measurement device 21, an accelerometer 22 and other sensors 23, including sensors for measuring pitch and roll. The time-of-flight laser distance measurement device 21 is a low-power laser with a maximum distance (height) limit for accurate measurements ($H_M$). The flight training assistant unit 11 has a processor 24. The processor 24 is configured to receive measurements from the sensors 21, 22, and 23 (primarily the time-of-flight laser distance measurement device 21) and based on these measurements, configured to calculate vertical height measurements of the aircraft above the ground during landing and takeoff modes of flight, The processor 24 is configured to make calculations to correct for user installation errors, such as the Flight Training Assistant 11 not being mounted with the time-of-flight laser distance measurement device 21 pointed perfectly straight down. In some alternative embodiments, the processor 24 is configured to calculate g-forces based on input from the accelerometer 22.

Utilizing inputs from these various sensors 21, 22, and 23, the processor 24 is configured to send messages via the communication link 12 to the notification unit 13. Notification unit 13 is configured to give aural, visual, or electronic displays and cues to a pilot learning to land an aircraft based on the messages received from the processor 24. The notification unit 13 is programmable for setpoints and cues. The notification unit 13 is configured to accept input for one or more cues and configured to accept input for one or more setpoints. Each setpoint can be associated with a cue instructing the pilot to perform a function. Examples of the cues include: "Verify approach stable," "roundout," and "flare." The notification unit 13 is user programmable as to the format in which a cue is given. Options may include aural readouts of messages, aural tones such as long and short beeps, or text on a display.

In some alternative embodiments, the processor 24 is configured to calculate, and the notification unit 13 to provide, roll and pitch indications in degrees, based on measurements from the other sensors 23. This can assist with landing an aircraft to determine the proper pitch and roll. This can assist with maneuvers such as turning and banking.

In some alternative embodiments, the output of the processor 24 is routed to an autopilot instead of the notification unit 13 or to both. In some alternative embodiments, processor 24 is configured to calculate, and the notification unit 13 to provide, indications of g-forces. This provides input to a pilot to learn to correlate the various physiological senses to the maneuvers being performed.

First Representative Embodiment—Operation

Figure 3:
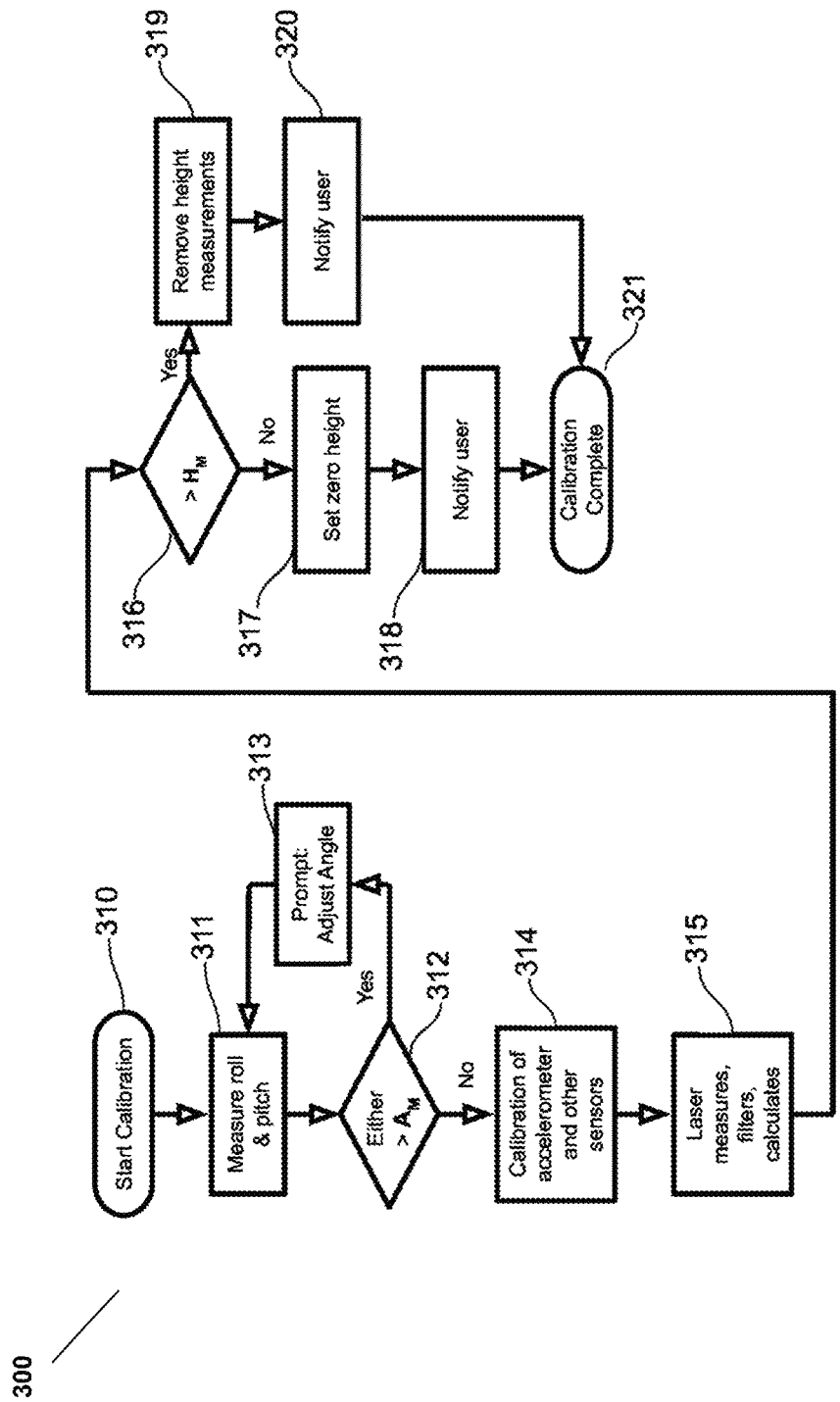
FIG. 3 shows a flow chart of a calibration process 300 for the flight training assistant system 10.

The flight training assistant unit 11 needs to be calibrated to work properly and so it is configured to perform a calibration process 300. Since the flight training assistant unit 11 can be mounted temporarily and could be moved between each usage, it needs to be calibrated each time it is moved and remounted. Prior to calibration, the flight training assistant unit 11 has been installed, attached to the aircraft attachment point 15 with a measuring end pointed down, while the aircraft is still on the ground. Referring to FIG. 3, the calibration process 300 starts at step 310 via external or automated means. The calibration process 300 continues with step 311 in which a roll angle and a pitch angle of the aircraft are determined by measurement and calculation. The calibration process 300 moves then to step 312, in which it is determined if either the roll angle or the pitch angle is over a maximum allowed angle ($A_M$) for calibration. If the determination in step 312 is yes, the calibration process 300 proceeds to step 313, in which an error message 313 is sent to prompt the user to adjust the orientation of the flight training assistant unit 11. This adjustment typically is performed by the pilot (or other user) manually. The calibration process 300 then loops back to step 311. If the determination in step 312 is no—the roll angle and pitch angle are within calibration parameters, the calibration process 300 proceeds to step 314, in which the processor 24 then calibrates the accelerometer 22 and other sensors 23. The calibration process 300 then advances to step 315, in which the time-of-flight laser distance measurement device 21 takes a time-of-flight distance measurement. Erroneous data (outlier measurements beyond set tolerance levels) and noise are filtered out from the time-of-flight distance measurement and a distance (height) of the aircraft is calculated.

The calibration process 300 proceeds to step 316, which determines if the distance (height) measured by the time-of-flight laser distance measurement device 21 is greater than a maximum distance limit for accurate measurements ($H_M$). If the determination in step 316 is yes, then the time-of-flight laser distance measurement device 21 has likely failed and step 319 is performed, in which the distance measurement functions are disabled from the notification unit 13. The pilot is notified that these functions are disabled in step 320. This allows the pilot to continue to use all other features of the flight training assistant unit 11 except height measurement. If the decision test in step 316 is no—a valid measurement was received—then the calibration process 300 moves to step 317 in which the flight training assistant unit 11 automatically sets a zero reference height, sets a zero pitch reference, sets a zero roll reference and notifies the user in step 318. The calibration process 300 then goes to completion in step 321.

Figure 4:
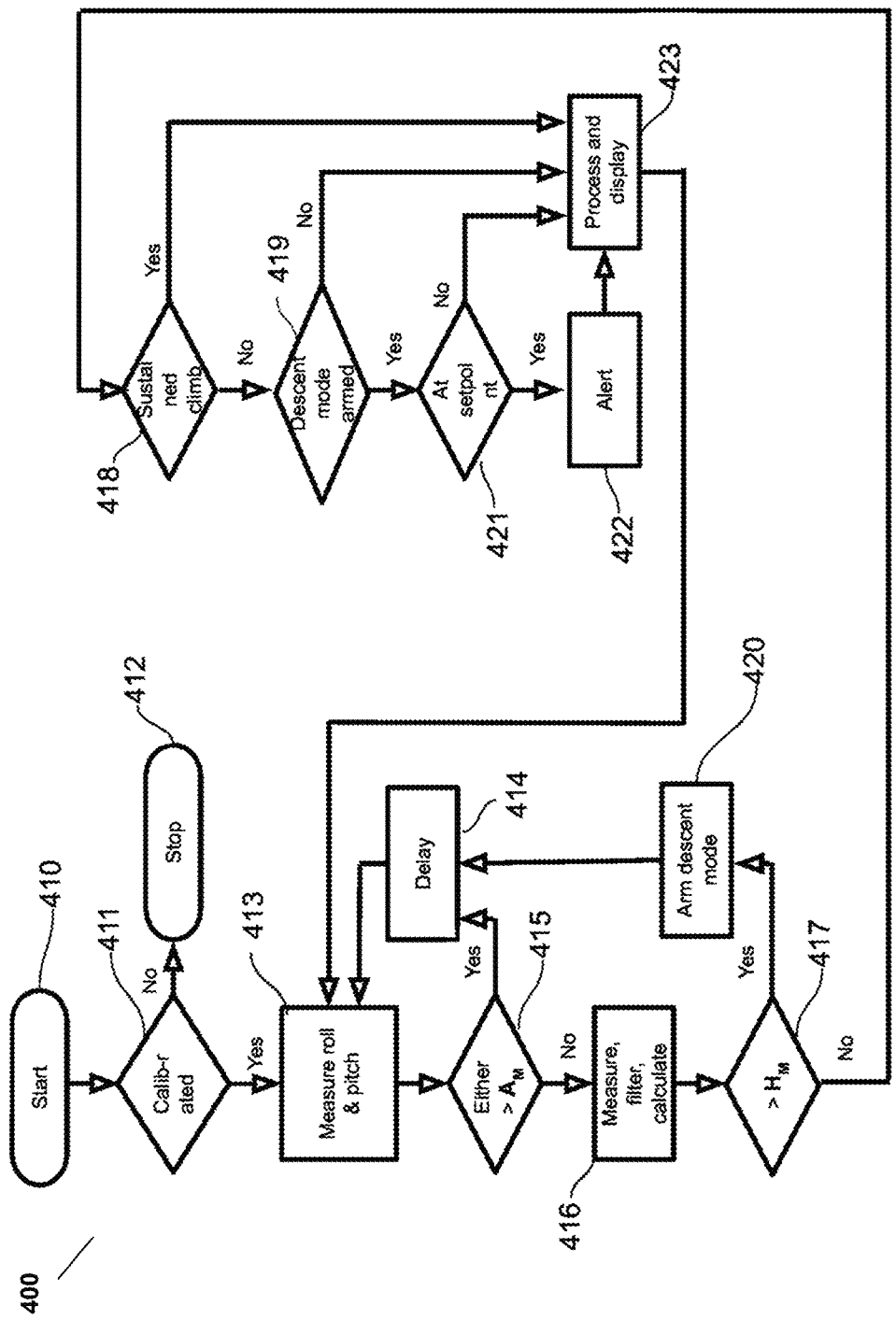
FIG. 4 shows a flow chart of a measurement process 400 for the flight training assistant system 10.

FIG. 4 shows a flow chart of a measurement process 400 for the flight training assistant system 10. The measurement process 400 starts at step 410 and proceeds to step 411, which verifies if the flight training assistant unit 11 was properly calibrated. If the determination of step 411 is no, the measurement process 400 will stop with step 412. It would be dangerous to provide measurements if the flight training assistant unit 11 were not calibrated. If the determination of step 411 is yes, the measurement process 400 proceeds to step 413 in which the flight training assistant unit 11 measures pitch and roll. Pitch and roll information may be displayed to the pilot. The measurement process 400 continues with step 415, which then determines if either the roll or the pitch is over a maximum allowed angle ($A_M$) for accurate height calculations. In the representative embodiment, the maximum allowed angle for accurate height calculations is the same as the maximum angle for calibration, but in other embodiments they may have different values. In other embodiments, the maximum allowed angle for pitch may be different than the maximum allowed angle for roll. If the determination of step 415 is yes, the measurement process 400 advances to step 414 for a delay before looping back to step 413 to try again. If the determination of step 415 is no, the measurement process 400 advances to step 416. In step 416, the time-of-flight laser distance measurement device 21 takes a time-of-flight distance measurement. Erroneous data (outlier measurements beyond set tolerance levels) and noise are filtered out from the time-of-flight distance measurement and the height of the aircraft is calculated.

The measurement process 400 proceeds to step 417, which determines if the measurement of the time-of-flight laser distance measurement device 21 is greater than the maximum distance limit for accurate measurements ($H_M$). If the determination in step 417 is yes, then the descent mode is armed in step 420 and the measurement process 400 enters delay step 414 to allow time for the aircraft to stabilize before looping back to step 413 to try again. If the determination in step 416 is yes, then the measurement process 400 proceeds to step 418, in which it is determined if the aircraft is in a sustained climb. If the determination of step 418 is yes, the measurement process 400 will go to step 423, in which the height information is processed and displayed to the pilot. If the determination of step 418 is no, the measurement process 400 proceeds to step 419 which determines if the decent mode is armed (see step 420). If the determination of step 419 is no, then the measurement process 400 goes to the process and display step 423, previously described. If the determination of step 419 is yes, then the measurement process 400 goes to step 421, which determines if the measured height is at a setpoint or has crossed the setpoint since the last time step 421 was performed. If the determination of step 421 is no, then the measurement process 400 goes to the process and display step 423, previously described. If the determination of step 421 is yes, then the measurement process 400 goes to Alert step 422, in which a cue is given to the pilot, aurally and/or on a display. The measurement process 400 then proceeds to the process and display step 423, previously described. After the process and display step 423 has been performed, the measurement process 400 loops back to step 413.

What is claimed is:

1. A flight training assistant system comprising:
    a notification unit;
    a flight training assistant unit configured to communicate with the notification unit over a communications link, the flight training assistant unit comprising:
        an aircraft mount configured for removably coupling to an attachment point of an aircraft;
        a distance measurement device configured for measuring a distance of the distance measurement device above the ground;
        a pitch sensor configured for measuring a pitch angle;
        a roll sensor configured for measuring a roll angle;
        a processor configured for:
            calibrating the flight training assistant unit using measurements from the distance measurement device, the pitch sensor, and the roll sensor;
            receiving measurements of the pitch angle and the roll angle;
            determining a measured height of the aircraft above the ground based on measurements from the distance measurement device if the roll angle does not exceed a maximum allowed roll angle and the pitch angle does not exceed a maximum allowed pitch angle;
            arming a descent mode if the measured height of the aircraft is determined to be more than a maximum height limit;
            sending information regarding the measured height of the aircraft to the notification unit; and
            sending an alert to the notification unit if the measured height of the aircraft is determined to be less than a maximum height limit and if the descent mode is armed and if the measured height of the aircraft is at a height setpoint or has crossed the height setpoint since last checked.

2. The flight training assistant system of claim 1, wherein the processor is further configured for:
    sending information regarding the pitch angle and the roll angle to the notification unit.

3. The flight training assistant system of claim 2 further comprises:
    an accelerometer.

4. The flight training assistant system of claim 3, wherein the processor is further configured for:
    calculating g-force based on measurements from the accelerometer; and
    sending information regarding the g-force to the notification unit.

5. The flight training assistant system of claim 1 wherein calibrating the flight training assistant unit further comprises:
    receiving measurements of the pitch angle and the roll angle;
    determining the measured height of the aircraft above the ground based on measurements from the distance measurement device if the roll angle does not exceed a maximum allowed roll angle and the pitch angle does not exceed a maximum allowed pitch angle, else sending a prompt to a user to adjust an orientation of the flight training assistant unit; and
    setting a zero reference height, a zero roll reference, and a zero pitch reference then sending a notification to the user indicating that calibration is complete if the measured height of the aircraft is determined to be less than the maximum height limit, else disabling the function of determining the measured height and sending a notification to the user that this function has been disabled.

6. A flight training assistant unit comprising:
    an aircraft mount configured for removably coupling to an attachment point of an aircraft;
    a distance measurement device;
    a pitch sensor configured for measuring a pitch angle;
    a roll sensor configured for measuring a roll angle;
    a processor configured for:

determining a measured height of the aircraft above the ground based on measurements from the distance measurement device;

arming a descent mode if the measured height of the aircraft is determined to be more than a maximum height limit;

sending information regarding the measured height of the aircraft via a wireless communication link to a notification unit; and sending an alert to the notification unit if the measured height of the aircraft is determined to be less than a maximum height limit and if the descent mode is armed and if the measured height of the aircraft is at a height setpoint or has crossed the height setpoint since last checked.

7. The flight training assistant unit of claim 6, wherein the processor is further configured for:

sending information regarding the pitch angle and the roll angle to the notification unit.

8. The flight training assistant unit of claim 7 further comprising:

an accelerometer.

9. The flight training assistant unit of claim 8, wherein the processor is further configured for:

calculating g-force based on measurements from the accelerometer; and sending information regarding the g-force to the notification unit.

10. The flight training assistant unit of claim 6 wherein calibrating the flight training assistant unit further comprises:

receiving measurements of the pitch angle and the roll angle;

determining the measured height of the aircraft above the ground based on measurements from the distance measurement device if the roll angle does not exceed a maximum allowed roll angle and the pitch angle does not exceed a maximum allowed pitch angle, else delaying, else sending a prompt to a user to adjust an orientation of the flight training assistant unit; and setting a zero reference height, a zero roll reference, and a zero pitch reference then sending a notification to the user indicating that calibration is complete if the measured height of the aircraft is determined to be less than the maximum height limit, else disabling the function of determining the measured height and sending a notification to the user that this function has been disabled.

11. A flight training assistant unit comprising:

an aircraft mount configured for coupling to an attachment point of an aircraft;

a distance measurement device;

a pitch sensor configured for measuring a pitch angle;

a roll sensor configured for measuring a roll angle; and a processor configured for determining a height of the aircraft based on measurements from the distance measurement device if the roll angle does not exceed a maximum allowed roll angle and the pitch angle does not exceed a maximum allowed pitch angle.

12. The flight training assistant unit of claim 11 wherein the maximum allowed roll angle is different than the maximum allowed pitch angle.

13. The flight training assistant unit of claim 11 wherein the maximum allowed roll angle is equal to the maximum allowed pitch angle.

14. The flight training assistant unit of claim 11 wherein the processor is further configured for:

arming a descent mode if the height of the aircraft is determined to be more than a maximum height limit;

sending information regarding the height of the aircraft via a communication link to a notification unit; and sending an alert to the notification unit if the height of the aircraft is determined to be less than a maximum height limit and if the descent mode is armed and if the height of the aircraft is at a height setpoint or has crossed the height setpoint since last checked.

15. The flight training assistant unit of claim 11 wherein the aircraft mount is configured for removably coupling to the attachment point of the aircraft.

16. The flight training assistant unit of claim 11 wherein the aircraft mount is configured for permanently coupling to the attachment point of the aircraft.

17. The flight training assistant unit of claim 11 wherein distance measurement device is a time-of-flight laser distance measurement device.

18. The flight training assistant unit of claim 11 wherein the processor is further configured for calibrating the flight training assistant unit using measurements from the distance measurement device, the pitch sensor, and the roll sensor.

* * * * *